Aug. 27, 1929.   B. H. REEVES   1,725,766
LIGHT REFLECTING UNIT
Filed Sept. 20, 1927

INVENTOR.
Beauford H. Reeves
BY
ATTORNEY

Patented Aug. 27, 1929.

1,725,766

UNITED STATES PATENT OFFICE.

BEAUFORD H. REEVES, OF NEW HAVEN, CONNECTICUT, ASSIGNOR TO RAY-SIGNS CORPORATION, A CORPORATION OF DELAWARE.

LIGHT-REFLECTING UNIT.

Application filed September 20, 1927. Serial No. 220,667.

My invention relates to light reflecting units such as are assembled in signs to form characters which are visible at night by reflected light; and has particular reference to units of this class which consist of a glass lens with a reflecting surface on the back thereof. The most effective units of this type are formed of a cylindrical body of glass with the front end spherically convex and constituting the objective end, and have a concave mirror properly associated with the rear end. The commercial units of this character with which I am familiar have a plano polished rear end, and the concave mirror is a separated metal member disposed immediately behind the rear end with its center of generation in the axis of the cylindrical body.

It has heretofore been proposed to make cylindrical units with both ends convex and to silver the rear end to form the concave mirror. Such a construction has certain obvious structural advantages over the two-piece unit, but it has been more expensive to produce. The reason for this is that the dimensional relations are fairly critical in order to get the optical effects desired, and the accuracy in the length can as a rule only be obtained by molding the unit of an excessive length and then grinding off the rear end until the right length is obtained.

This practice is necessitated by the limitations of the art of molding glass. To mold an article of this character the molder commonly takes an estimated quantity of glass in a plastic state and places it in a mold and operates a plunger to press the glass into the mold. The plunger is of the size of the cylindrical mold and the extent to which it enters into the mold varies with the quantity of glass therein and the lengths of the molded articles correspondingly vary. The grinding off of this rear end adds materially to the cost of the article, and it is cheaper to grind it plano than it would be to grind it spherically convex.

The units which constitute my invention are susceptible of being molded in definite lengths, and the particular and expensive grinding operation to get the definite length is thereby avoided. The center part of the rear surface is the reflecting surface, and the annular margin which surrounds this is raised. The depression within the annulus may be filled with a suitable protective compound and the whole end covered with a metallic cap or the like.

The method of making these units is to employ a plunger of lesser diameter than the outer end of the mold and to allow the excess glass to escape around the plunger, thus forming a raised annuls of varying height depending upon the quantity of the glass. This annulus is then cut off to a given height, my practice being to leave enough to form a substantial recess or depression, although it may all be removed according to my method if desired, to the level of the central molded surface. Therefore, while my method is most useful in the production of units having the rear end convex and silvered to form the reflecting surface, it may also be employed to produce units having plano molded rear ends which are used with separate reflectors.

A characteristic of a desirable form of my unit is the fact that the rear end is enlarged at least to the extent of the thickness of the annulus surrounding the reflecting surface so that the reflecting surface need be no smaller than the objective end, and in some instances it is desirable to make the rear end still larger so that the reflecting surface may be larger than the objective end, thereby increasing the useful angular range or effective aperture of the device. All of this is easily accomplished by my method, and if the body portion is not tapered from the front to the rear end, the enlarged end or head joins the body portion with a shoulder under which the protective cap may be clinched.

Other advantages of my invention will appear from the following particular decription of certain embodiments thereof as illustrated in the accompanying drawings in which.

Figure 1:
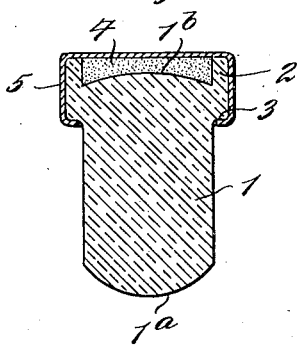
Figs. 1 and 2 are sections of slightly different embodiments.

As shown in Fig. 1, the reflecting unit consists of a generally cylindrical body of glass 1 having a spherically convex front end $1^a$ constituting the objective end of the lens and a convex rear end $1^b$ which is substantially of the same diameter as the front end $1^a$. This rear surface $1^b$ is silvered so as to form a concave reflecting surface, and surrounding this reflecting surface is a raised annular rim 2. The rear end of the unit is enlarged by the thickness of this annulus 2, thereby forming a shoulder 3. The depression within the annulus 2 is filled with a suitable waterproof compound 4 which protects the silvered surface, and a metallic cap 5 fits over the enlarged rear end and is clinched underneath the shoulder 3.

Figure 2:
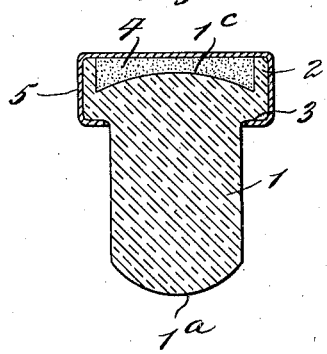

The unit illustrated in Fig. 2 is similar to that of Fig. 1 except that the rear end is more enlarged than is that of the unit of Fig. 1, while the thickness of the annulus 2 is substantially the same. In other words, the rear surface 1$^c$ is in this case larger than the objective end 1$^a$ with a consequent increase in effective aperture of the unit.

Figure 3:
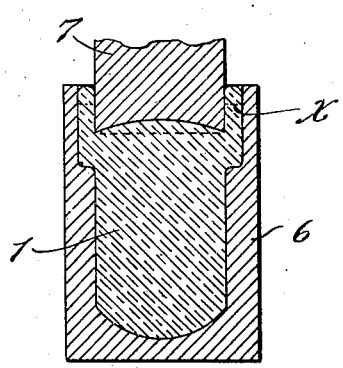
Fig. 3 is a section of a mold illustrating its method of making my improved reflecting unit.

In Fig. 3 is illustrated a mold for making the unit such as is shown in Fig. 1. The body of the mold 6 has a cylindrical cavity with its rear end in enlarged diameter. Glass in a plastic state is placed in this mold and a plunger 7 is then forced within the mold to a definite predetermined distance. The excess glass is squeezed up around the plunger as illustrated in Fig. 3, to a greater or less extent depending upon the variable amount of glass that is placed in the mold. The inner end of the plunger 7 is spherically concave, thereby forming the rear convex surface of the unit which is to be silvered. The annular rim formed by the excess glass which is squeezed out around the plunger is cut off to a desired height, for example, to the height of the broken line marked $x$ in Fig. 3. In this way, the rear reflecting face may be molded and a grinding operation be thereby obviated.

It is obvious that various modifications may be made in the dimensions and particular details of the illustrated constructions without departing from the scope of my invention as pointed out in the appended claims.

I claim:

1. A light reflecting unit comprising a cylindrical body of glass with one end lenticular and the other end including a convex surface constituting a concave reflector and a raised annular marginal portion surrounding the reflecting surface.

2. A light reflecting unit comprising a cylindrical body of glass with its front end spherical and a concave reflecting surface at the rear end and having an annular marginal portion surrounding the reflecting surface and extending rearwardly thereof.

3. A light reflecting unit comprising a cylindrical body of glass with its front end face spherically convex and its rear end of enlarged diameter and having in its rear end face a concave reflecting surface and having an annular marginal portion coaxial with the cylindrical body surrounding the reflecting surface and extending rearwardly thereof.

4. A light reflecting unit comprising a cylindrical body of glass with its front end face spherically convex and its rear end of enlarged diameter and having in the rear face a concave reflecting surface larger in diameter than the front face and having an annular marginal portion surrounding the reflecting surface and extending rearwardly thereof.

5. A light reflecting unit comprising a cylindrical body of glass with its front face spherically convex and its rear end of enlarged diameter and having in its rear end face a concave reflecting surface, an annular marginal portion at the rear end surrounding the reflecting surface and extending rearwardly thereof a waterproof compound within the annular marginal portion and covering the reflecting surface, and a metallic cap covering the rear end of the unit.

In witness whereof, I hereunto subscribe my signature.

BEAUFORD H. REEVES.